(12) United States Patent
Uchino et al.

(10) Patent No.: US 10,230,430 B2
(45) Date of Patent: Mar. 12, 2019

(54) MOBILE STATION AND MOBILE COMMUNICATION SYSTEM

(71) Applicant: NTT DOCOMO, INC., Tokyo (JP)

(72) Inventors: Tooru Uchino, Tokyo (JP); Sadayuki Abeta, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 145 days.

(21) Appl. No.: 14/912,617

(22) PCT Filed: Aug. 20, 2014

(86) PCT No.: PCT/JP2014/071751
§ 371 (c)(1),
(2) Date: Feb. 18, 2016

(87) PCT Pub. No.: WO2015/025879
PCT Pub. Date: Feb. 26, 2015

(65) Prior Publication Data
US 2016/0205699 A1    Jul. 14, 2016

(30) Foreign Application Priority Data
Aug. 21, 2013   (JP) ................................. 2013-171402

(51) Int. Cl.
*H04B 7/022* (2017.01)
*H04W 72/04* (2009.01)
*H04W 72/10* (2009.01)

(52) U.S. Cl.
CPC ........ *H04B 7/022* (2013.01); *H04W 72/0486* (2013.01); *H04W 72/0413* (2013.01); *H04W 72/10* (2013.01)

(58) Field of Classification Search
None
See application file for complete search history.

(56) References Cited

U.S. PATENT DOCUMENTS

| 8,335,164 B2 * | 12/2012 | Liu | ........................ | H04L 45/124 370/252 |
| 2009/0052384 A1 * | 2/2009 | Zisimopoulous | ....... | H04L 47/14 370/329 |

(Continued)

FOREIGN PATENT DOCUMENTS

| CN | 102474874 A | 5/2012 |
| CN | 103052116 A | 4/2013 |

(Continued)

OTHER PUBLICATIONS

Extended European Search Report issued in the counterpart European Patent Application No. 14837826.8, dated Mar. 14, 2017 (11 pages).

(Continued)

*Primary Examiner* — Chi H Pham
*Assistant Examiner* — Vladislav Y Agureyev
(74) *Attorney, Agent, or Firm* — Osha Liang LLP

(57) ABSTRACT

An adequate transmission rate is guaranteed in a case where "Inter-node UP aggregation" is being performed. In a mobile station according to the present invention, each of MAC layer functions includes a cost management unit configured to manage a cost of an LCH involved in "Inter-node UP aggregation", a priority management unit configured to manage a priority of the LCH, and a bearer management unit configured to allocate transmission resources to data for the LCH based on the priority and the cost of the LCH. The cost management unit is configured to update the cost of the LCH managed by the cost management unit itself, based on a PBR value informed by a network.

6 Claims, 6 Drawing Sheets

(56) References Cited

U.S. PATENT DOCUMENTS

| | | | |
|---|---|---|---|
| 2010/0167741 A1* | 7/2010 | Lee | H04W 72/06 455/436 |
| 2010/0284278 A1* | 11/2010 | Alanara | H04L 47/11 370/235 |
| 2011/0038333 A1 | 2/2011 | Yi et al. | |
| 2011/0164532 A1* | 7/2011 | Kawamura | H04L 1/0017 370/254 |
| 2011/0170495 A1 | 7/2011 | Earnshaw et al. | |
| 2012/0057547 A1* | 3/2012 | Lohr | H04L 5/0007 370/329 |
| 2012/0120880 A1* | 5/2012 | Lee | H04W 72/02 370/329 |
| 2013/0201832 A1* | 8/2013 | Kang | H04W 28/0284 370/235 |
| 2013/0242746 A1* | 9/2013 | Ikemoto | H04W 8/005 370/238 |
| 2014/0056243 A1* | 2/2014 | Pelletier | H04W 74/04 370/329 |
| 2014/0254476 A1* | 9/2014 | Blankenship | H04L 47/20 370/328 |

FOREIGN PATENT DOCUMENTS

| | | | |
|---|---|---|---|
| EP | 2753035 A2 | 7/2014 | |
| GB | 2491138 A * | 11/2012 | H04W 72/10 |
| WO | 2013053339 A2 | 4/2013 | |

OTHER PUBLICATIONS

International Search Report issued in corresponding application No. PCT/JP2014/071751 dated Nov. 4, 2014 (2 pages).

Written Opinion of the International Searching Authority issued in corresponding application No. PCT/JP2014/071751 dated Nov. 4, 2014 (3 pages).

3GPP TS 36.321 V10.9.0, "3rd Generation Partnership Project; Technical Specification Group Radio Access Network; Evolved Universal Terrestrial Radio Access (E-UTRA); Medium Access Control (MAC) protocol specification (Release 10)"; Jun. 2013 (54 pages).

Huawei, HiSilicon, "Throughput results for inter-frequency deployment of small cells"; 3GPP TSG-RAN WG2 Meeting #82, R2-131782; Fukuoka, Japan, May 20-24, 2013 (5 pages).

Office Action issued in corresponding European Application No. 14837826.8, dated Feb. 21, 2018 (5 pages).

Office Action issued in corresponding Chinese Patent Application No. 201480046044.6, dated Jul. 3, 2018 (21 pages).

* cited by examiner

FIG. 7
(a)
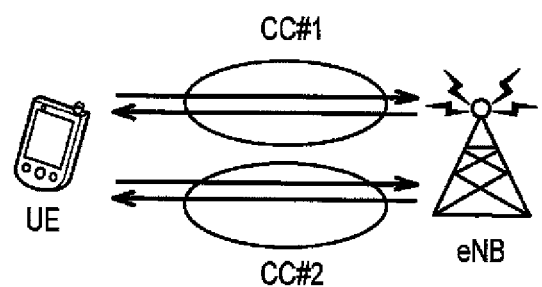
(b)
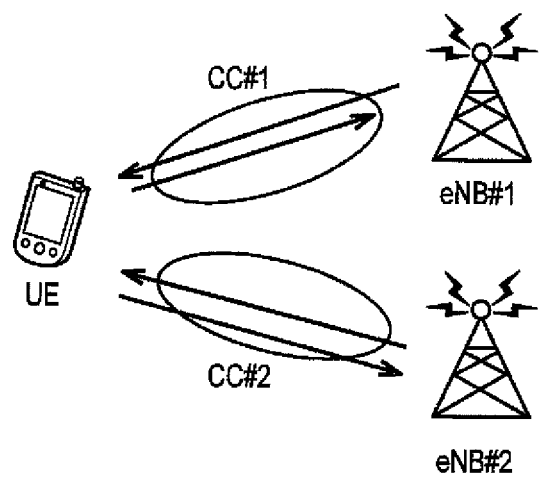

MOBILE STATION AND MOBILE COMMUNICATION SYSTEM

TECHNICAL FIELD

The present invention relates to a mobile station and a mobile communication system.

BACKGROUND ART

In LTE (Long Term Evolution), each LCH (Logical Channel), in other words, each EPS (Evolved Packet System) bearer is operated under PER (Prioritized Bit Rate) control in MAC (Media Access Control) layer in an uplink, so that a transmission rate at a certain level can be guaranteed (see Non-Patent Document 1).

In LTE, in a case where such PBR control is not being performed and where there are two LCHs different in priority, for example, data for the LCH at the lower priority cannot be transmitted unless all data for the LCH at the higher priority is transmitted.

In short, the foregoing PBR control aims at avoiding such a situation (Starvation).

Specifically, in order to perform such PBR control, it is necessary in the MAC layer to manage the costs (Bj) of the respective LCHs, and to execute the following steps in a TTI (Transmission Time Interval) in which the allocation of new transmission resources specified by "UL grant" takes place.

In step 1, the aforementioned new transmission resources are allocated to data for LCHs having positive costs in descending order of the priority.

In step 2, in the LCH to which the aforementioned new transmission resources are allocated, the cost of the LCH is decremented by the data volume of the MAC-SDU corresponding to the transmission resources allocated.

In step 3, if new transmission resources still allocatable remain after completion of the allocation of transmission resources for the data for LCHs having the positive costs, the transmission resources are allocated for data for LCHs having negative costs in descending order of the priority.

Meanwhile, CA (Carrier Aggregation) specified in LTE Release-10 is capable of achieving high throughput through simultaneous communications using CC(Component Carrier) #1 and CC#2 under the same radio base station eNB as illustrated in FIG. 7(a).

On the other hand, in LTE Release-12, "Inter-node UP aggregation" to which the CA in LTE Release-10 is extended is under considerations (see Non-Patent Document 2). "Inter-node UP aggregation" is intended to achieve high throughput through simultaneous communications using CC#1/CC#2 under different radio base stations eNB#1/eNB#2 as illustrated in FIG. 7(b). For example, if all the CCs cannot be accommodated in a single radio base station eNB, it is necessary to perform "Inter-node UP aggregation" in order to achieve the throughput comparable to that of LTE Release-10

PRIOR ART DOCUMENT

Non-Patent Document

NON-PATENT DOCUMENT 1: 3GPP TS36.321
NON-PATENT DOCUMENT 2: 3GPP TDocs (written contribution) R2-131782

SUMMARY OF THE INVENTION

However, if each of MAC layer functions (MAC entities) performs the foregoing PBR control under execution of "Inter-node UP aggregation", the MAC layer functions guarantee a transmission rate excessively high for the EPS bearer, which is a problem undesirable from the viewpoint of the prioritization control.

For example, as illustrated in FIG. 8, if a particular EPS bearer is operated simply under PER control with the setting of the "PBR value=16 kbps", then the MAC layer functions in the mobile station UE for the particular EPS bearer each guarantee the transmission rate of 16 kbps. In other words, in the case where the mobile station UE communicates with two radio base stations eNB#1/eNB#2, the transmission rate of 32 kbps is resultantly guaranteed for such particular EPS bearer even though the guaranteeing of the transmission rate of 16 kbps is sufficient.

Therefore, the present invention has been made in light of the foregoing problem, and has an objective to provide a mobile station and a mobile communication system capable of guaranteeing an adequate transmission rate in a case where "Inter-node UP aggregation" is being performed.

A first feature of the present invention is summarized as a mobile station configured to be able to perform carrier aggregation using a component carrier under a first radio base station and a component carrier under a second radio base station, the mobile station including MAC layer functions each of which is provided for each of the component carriers or each of management units configured to manage communications with the respective radio base stations. Here, each of the MAC layer functions includes: a cost management unit configured to manage a cost of a logical channel involved in the carrier aggregation; a priority management unit configured to manage a priority of the logical channel; and a bearer management unit configured to allocate transmission resources to data for the logical channel based on the priority and the cost of the logical channel, and the cost management unit is configured to update the cost of the logical channel managed by the cost management unit itself, based on a PBR value informed by a network.

A second feature of the present invention is summarized as a mobile station configured to be able to perform carrier aggregation using a component carrier under a first radio base station and a component carrier under a second radio base station, the mobile station including MAC layer functions each of which is provided for each of the component carriers or each of management units configured to manage communications with the respective radio base stations. Here, each of the MAC layer functions includes: a cost management unit configured to manage a cost of a logical channel involved in the carrier aggregation, the cost of the logical channel corresponding to a PBR value set for the logical channel; a priority management unit configured to manage a priority of the logical channel; and a bearer management unit configured to allocate transmission resources to data for the logical channel based on the priority and the cost of the logical channel, and the cost management unit is configured to exchange information on the costs of the logical channels with the cost management unit in the other MAC layer function, and update the cost of the logical channel managed by the cost management unit itself.

A third feature of the present invention is summarized as a mobile communication system configured to enable a mobile station to perform carrier aggregation using a component carrier under a first radio base station and a component carrier under a second radio base station. Here, the mobile station includes MAC layer functions each of which is provided for each of the component carriers or each of management units configured to manage communications with the respective radio base stations, each of the MAC layer functions includes: a cost management unit configured to manage a cost of a logical channel involved in the carrier aggregation; a priority management unit configured to manage a priority of the logical channel; and a bearer management unit configured to allocate transmission resources to data for the logical channel based on the priority and the cost of the logical channel, and the first radio base station or the second radio base station is configured to inform each of the MAC layer functions of a PBR value to be set, and the cost management unit of each of the MAC layer functions is configured to update the cost of the logical channel managed by the cost management unit itself, based on the informed PBR value.

BRIEF DESCRIPTION OF THE DRAWINGS

FIG. 7 illustrates diagrams for explaining a conventional technique.

DETAILED DESCRIPTION (Mobile Communication System According to First Embodiment of the Present Invention)

With reference to FIGS. 1 to 4, description is provided for a mobile communication system according to a first embodiment of the present invention.

Figure 1:
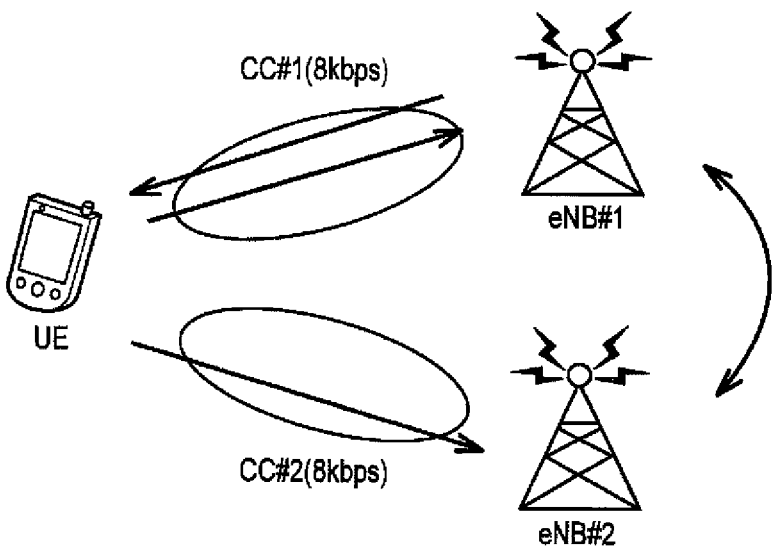
FIG. 1 is an overall configuration diagram of a mobile communication system according to a first embodiment of the present invention.

As illustrated in FIG. 1, a mobile communication system according to the present embodiment is an LTE mobile communication system and includes a radio base station eNB#1 that manages a cell #1, a radio base station eNB#2 that manages a cell #2, and a mobile station UE.

In the mobile communication system according to the present embodiment, the mobile station UE is configured to be capable of executing CA using the cell #1 or CC(Component Carrier) #1 under the radio base station eNB#1, and the cell #2 or CC#2 under the radio base station eNB#2.

In other words, the mobile communication system according to the present embodiment is configured to be capable of executing "Inter-node UP aggregation".

In the present embodiment, the mobile station UE is assumed to execute "Inter-node UP aggregation" using the CC#1 (i.e., cell #1) and the CC#2 (i.e., cell 42).

In the configuration of the present embodiment, only one EPS bearer is established even in the case where the mobile station UE executes "Inter-node UP aggregation" using the CC1# and the CC#2.

Here, in the mobile communication system according to the present embodiment, the radio base station eNB#1 is a master radio base station MeNB (Master-eNB) or a macro-cell radio base station MeNB (Macro-eNB), and the radio base station eNB#2 is a secondary radio base station SeNB (Secondary-eNB) or a small-cell radio base station SeNB (Small-eNB).

In addition, the mobile station UE according to the present embodiment may be provided with a MAC layer function for each CC. In this case, a MAC layer function #1 controls the CC#1, and a MAC layer function #2 controls the CC#2.

Instead, the mobile station UE according to the present embodiment may be provided with a MAC layer function for each of management units configured to manage communications with the respective radio base stations eNB. In this case, for example, if the number of radio base stations eNB communicating with the mobile station UE is two even though three or more CCs are set in the mobile station UE, the number of MAC layer functions is two.

Figure 2:
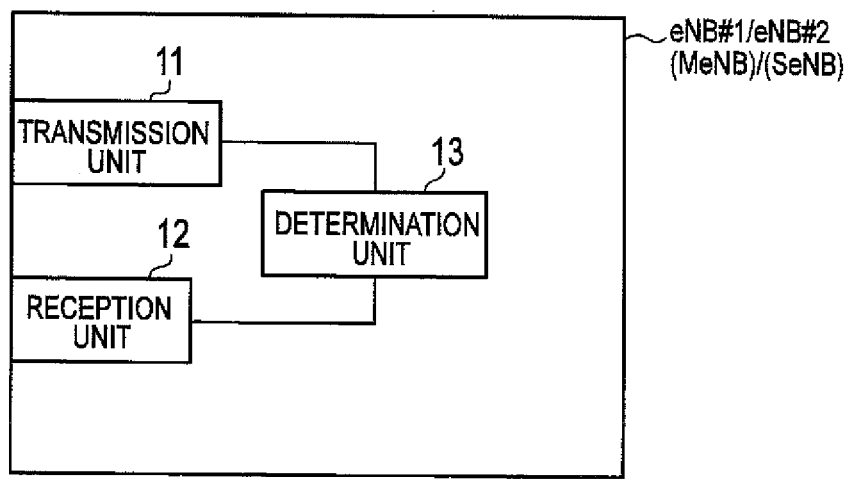
FIG. 2 is a functional block diagram of each of radio base stations eNB#1, eNB#2 according to the first embodiment of the present invention.

As illustrated in FIG. 2, each of the radio base stations eNB#1, eNB#2 according to the present embodiment includes a transmission unit 11, a reception unit 12, and a determination unit 13. Since the configuration of the radio base station eNB#1 is the same as the configuration of the radio base station eNB#2, only the configuration of the radio base station eNB#1 is explained below. The transmission unit 11 is configured to transmit various kinds of signals to the mobile station UE and the radio base station eNB#2, and the reception unit 12 is configured to receive various kinds of signals from the mobile station UE and the radio base station eNB#2.

The determination unit 13 is configured to determine a PBR value to be transmitted to the MAC layer function #1 or each of the MAC layer functions #1, #2 in the mobile station UE, that is, a transmission rate to be guaranteed in the MAC layer function #1 or each of the MAC layer functions #1, #2 in the mobile station UE.

Then, the transmission unit 11 is configured to inform the MAC layer function #1 or each of the MAC layer functions #1, #2 in the mobile station UE of the PBR value determined by the determination unit 13 as the PBR value to be set.

For example, the determination unit 13 in a particular radio base station eNB (for example, the radio base station eNB#1) may be configured to determine the PBR values to be transmitted to all the MAC layer functions #1, #2 in the mobile station UE.

In this case, the transmission unit 11 in the particular radio base station eNB (for example, the radio base station eNB#1) may be configured to notify the other radio base station eNB (for example, the radio base station eNB#2) of the PBR value to be set in the CC#2, and the other radio base station eNB may be configured to comply with the notified value.

Alternatively, as illustrated in FIG. 1, the radio base station eNB#1 and the radio base station eNB#2 may be configured to determine the PBR values to be transmitted to the respective MAC layer functions #1, #2 in the mobile station UE through a negotiation therebetween, more specifically, in such a way that the radio base station eNB#1 and the radio base station eNB#2 negotiate with each other.

For example, in one possible configuration, the determination unit 13 in the radio base station eNB#1 may notify the radio base station eNB#2 of the PBR value desired to be set in the CC#2, and the transmission unit 11 in the radio base station eNB#2 may return ACK to the radio base station eNB#1 if the notified PBR value can be guaranteed in the CC#2, or may return NACK to the radio base station eNB#1 if the notified PBR value cannot be guaranteed in the CC#2.

Here, the transmission unit 11 in the radio base station eNB#2 may be configured to, when returning NACK to the radio base station eNB#1, also notify the radio base station eNB#1 of the PBR value that can be guaranteed in the CC#2.

In another possible configuration, the determination unit 13 in the radio base station eNB#1 may request the radio base station eNB#2 to provide a range or one or more candidates of the PBR value achievable in the CC#2, the determination unit 13 in the radio base station eNB#2 may determine the range or one or more candidates of the PER value achievable in the CC#2, and the transmission unit 11 in the radio base station eNB#2 may notify the radio base station eNB#1 of the range or one or more candidates of the PBR value achievable in the CC#2.

In this configuration, the determination unit 13 in the radio base station eNB#2 may determine the range or one or more candidates of the achievable PBR value based on the band width supported by the radio base station eNB#2 or congestion degrees.

Here, such congestion degrees include the number of mobile station UE connected, the number of bearers established, a percentage of mobile stations UE in non-DRX state, a percentage of mobile stations UE performing CA, and similar indicators.

Then, in this configuration, the determination unit 13 in the radio base station eNB#1 may determine the PBR value from the range or one or more candidates of the PER value achievable in the CC#2, and the transmission unit 11 in the radio base station eNB#1 may notify the radio base station eNB#2 of the determined PBR value.

In this case, the transmission unit 11 in the particular radio base station eNB (for example, the radio base station eNB#1) may be configured to inform all, the MAC layer functions #1, #2 in the mobile station UE of the PBR values to be set.

Instead, the determination unit 13 in the radio base station eNB#1 and the determination unit 13 in the radio base station eNB#2 may be each configured to determine the PBR value to be transmitted to the corresponding one of the MAC layer functions #1, #2 in the mobile station UE.

In this case, the transmission unit 11 in the radio base station eNB#1 and the transmission unit 11 in the radio base station eNB#2 may be configured to inform the respective MAC layer functions #1, #2 in the mobile station US of the PBR values to be set.

Specifically, the transmission unit 11 in the radio base station eNB#1 may be configured to inform the MAC layer function #1 in the mobile station UE of the PBR value to be set, and the transmission unit 11 in the radio base station eNB#2 may be configured to inform the MAC layer function #2 in the mobile station US of the PBR value to be set.

In the example of FIG. 1, the transmission unit 11 in the radio base station eNB#1 may be configured to inform the MAC layer function #1 in the mobile station UE of "8 kbps" as the PBR value to be set, and inform the MAC layer function #2 in the mobile station UE of "8 kbps" as the PBR value to be set.

As a result, 16 kbps can be guaranteed for the EPS bearer involved in the foregoing "Inter-node UP aggregation".

It should be noted that the transmission unit 11 in the radio base station eNB#1 may be configured to inform each of the MAC layer functions #1, #2 in the mobile station UE of the PBR value itself explicitly, the PBR value determined by the determination unit 13.

Alternatively, the transmission unit 11 in the radio base station eNB#1 may be configured to inform the MAC layer functions #1, #2 in the mobile station UE of the PBR values to be set in the respective MAC layer functions #1, #2 in the mobile station UE, in the form of a ratio between the MAC layer functions.

For example, the transmission unit 11 in the radio base station eNB#1 may be configured to inform the MAC layer function #1 in the mobile station UE of "70%" as the PBR value to be set, and inform the MAC layer function #2 in the mobile station UE of "30%" as the PBR value to be set.

Figure 3:
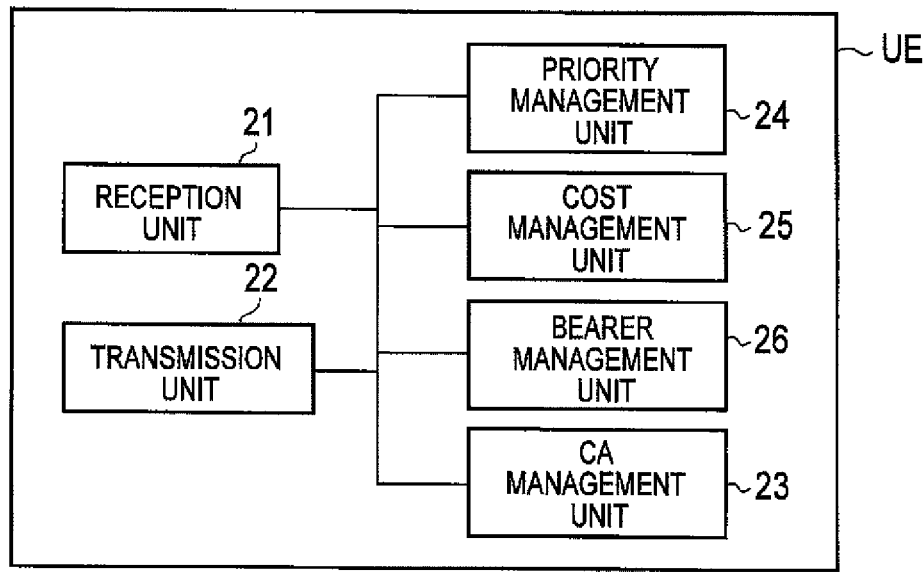
FIG. 3 is a functional block diagram of a mobile station UE according to the first embodiment of the present invention.

As illustrated in FIG. 3, the mobile station UE according to the present embodiment includes, as each MAC layer function, a reception unit 21, a transmission unit 22, a CA management unit 23, a priority management unit 24, a cost management unit 25, and a bearer management unit 26.

Here, at least one of the reception unit 21, the transmission unit 22, the CA management unit 23, the priority management unit 24, the cost management unit 25, and the bearer management unit 26 may be provided outside the MAC layer function.

The reception unit 21 is configured to receive various kinds of signals from the radio base station eNB#1 and the radio base station eNB#2, and the transmission unit 22 is configured to transmit various kinds of signals to the radio base station eNB#1 and the radio base station eNB#2.

The CA management unit 23 is configured to perform control and management necessary for the foregoing "Inter-node UP aggregation".

The priority management unit 24 is configured to manage the priority of each LCH involved in the foregoing "Inter-node UP aggregation".

The cost management unit 25 is configured to manage the cost of each LCH involved in the foregoing "Inter-node UP aggregation".

The bearer management unit 26 is configured to allocate transmission resources for data for each LCH based on the priority and the cost of the LCH. In other words, the bearer management unit 26 is configured to perform already-known PBR control to allocate the transmission resources for the data for the LCHs.

Here, the cost management unit 25 is configured to update the costs of the LCHs managed by itself, based on the PBR values informed by the network (for example, the radio base station eNB#1 and/or the radio base station eNB#2).

In addition, the cost management unit 25 may be configured to, when the MAC layer function is reset, reset the cost of the LCH managed by itself to an initial value.

Moreover, for a case where the PBR values are not informed explicitly by the network (for example, the radio base station eNB#1 and/or the radio base station eNB#2), the cost management unit 25 may be configured to autonomously regard the cost of the LCH corresponding to the PBR value to be set in each MAC layer function, as the cost of the LCH corresponding to the transmission rate to be guaranteed as the EPS bearer.

Hereinafter, with reference to FIG. 4, description is provided for an operation of the mobile communication system according to the present embodiment, more specifically, an operation of the mobile station UE according to the present embodiment.

Figure 4:
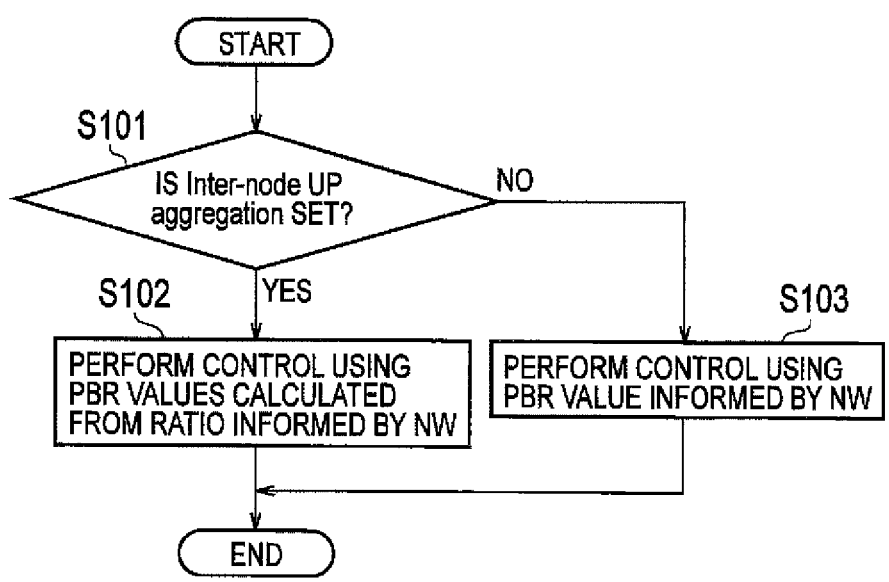
FIG. 4 is a flowchart presenting an example of an operation of the mobile station UE according to the first embodiment of the present invention.

As illustrated in FIG. 4, in step S101, the mobile station UE determines whether the foregoing "Inter-node UP aggregation" is being performed or not.

The mobile station UE advances this operation to step S102 if it determines that the foregoing "Inter-node UP aggregation" is being performed, or advances this operation to step S103 if it determines that the foregoing "Inter-node UP aggregation" is not being performed.

In step S102, the mobile station UE allocates the transmission resources to the data for the LCHs based on the PBR values calculated from the ratio informed by the network.

On the other hand, in step S103, the mobile station UE allocates the transmission resources to the data for the LCHs based on the transmission rates (PBR values) informed by the network as the transmission rates to be guaranteed as the EPS bearers.

(Mobile Communication System according to Second Embodiment of the Present Invention)

Figure 5:
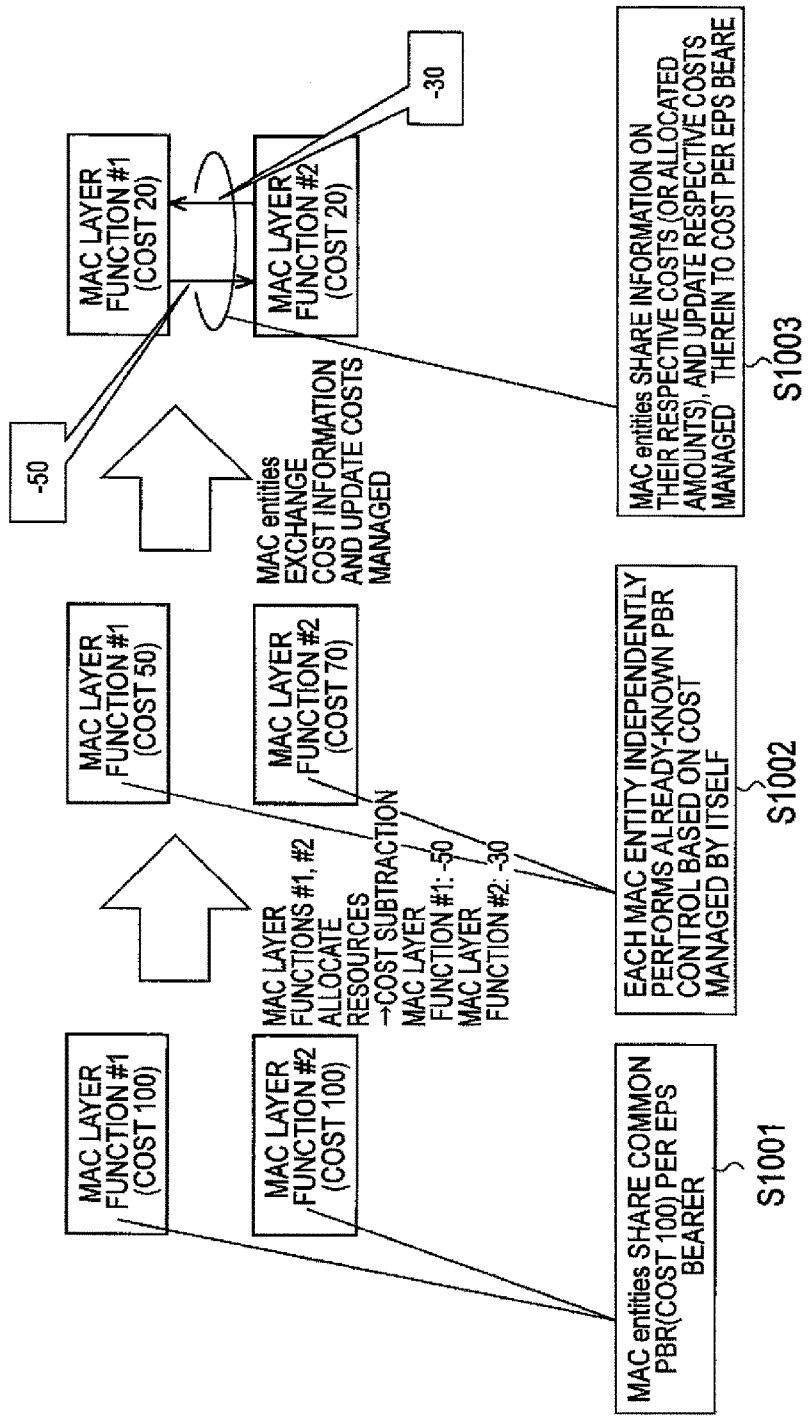
FIG. 5 is a diagram for explaining an example of an operation of the mobile station UE according to a second embodiment of the present invention.
Figure 6:
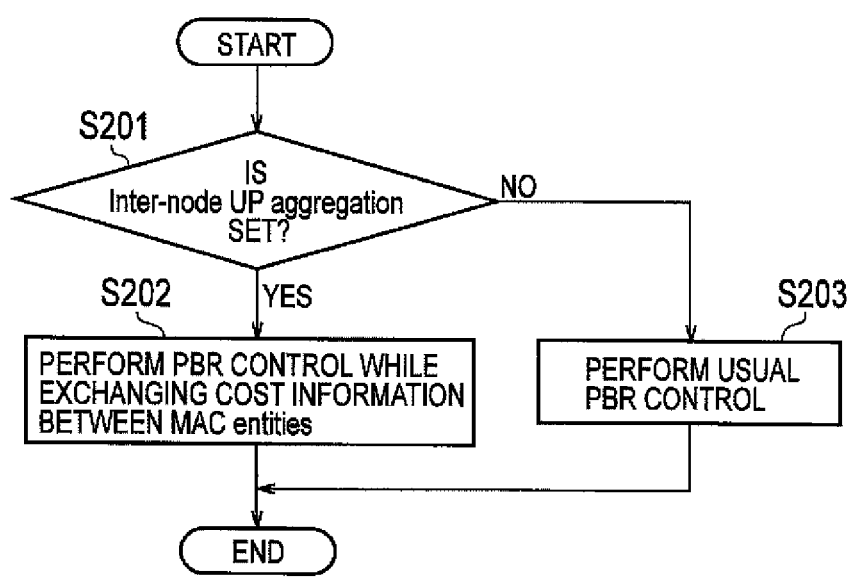
FIG. 6 is a flowchart presenting an example of an operation of the mobile station UE according to the second embodiment of the present invention.
Figure 8:
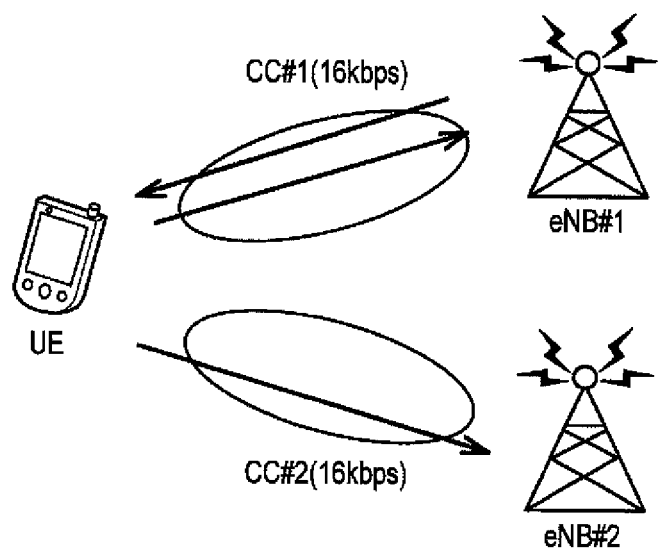
FIG. 8 illustrates a diagram for explaining the conventional technique.

With reference to FIGS. 5 and 6, a mobile communication system according to a second embodiment of the present invention is described with focus placed on different points from those in the aforementioned mobile communication system according to the first embodiment.

In the mobile communication system according to the present embodiment, a network (for example, a radio base station eNB#1 and/or a radio base station eNB#2) is configured not to inform MAC layer functions in a mobile station UE of the aforementioned PBR values.

In addition, in the mobile communication system according to the present embodiment, the mobile station UE is configured such that a cost management unit 25 of a certain MAC layer function exchanges information on the costs of LCHs with a cost management unit 25 of another MAC layer function, and updates the cost of the LCH managed by itself.

Here, in one possible configuration, such exchange of information on the costs of the LCHs and update of the costs of the LCHs may be performed cyclically, or may be triggered by the occurrence of a predetermined event. Alternatively, the cycle for exchanging information on costs of LCHs and updating the costs of the LCHs may be set by the network.

For example, the mobile station UE may be configured to determine that the predetermined event takes place if at least one of the costs of the LCHs managed by the cost management units 25 of the MAC layer functions #1, #2 in the mobile station UE falls to or below a predetermined threshold.

Here, with reference to FIG. 5, description is provided for how the MAC layer function #1 in the mobile station UE and the MAC layer function #2 in the mobile station UE update the costs of LCHs involved in the foregoing "Inter-node UP aggregation".

The example of FIG. 5 is based on the assumption that the PBR value (cost) corresponding to the transmission rate to be guaranteed as the EPS bearer involved in the foregoing "Inter-node UP aggregation" is "100".

As illustrated in FIG. 5, in step S1001, the cost management unit 25 in the MAC layer function #1 and the cost management unit 25 in the MAC layer function #2 manage "100" as the costs of LCHs involved in the foregoing "Inter-node UP aggregation".

Thereafter, a bearer management unit 26 in the MAC layer function #1 allocates transmission resources corresponding to "cost=50" to the data for the LCH, and a bearer management unit 26 in the MAC layer function #2 allocates transmission resources corresponding to "cost=30" to the data for the LCH. Then, in step S1002, the cost management unit 25 in the MAC layer function #1 updates the aforementioned cost of the LCH to "50", and the cost management unit 25 in the MAC layer function #2 updates the aforementioned cost of the LCH to "70".

Here, the cost management unit 25 in the MAC layer function #1 and the cost management unit 25 in the MAC layer function #2 exchange information on the costs of the LCHs (for example, information on the current costs of the LCHs, information on the transmission resources allocated to the data for the LCHs, or the like).

As a result, in step S1003, the cost management unit 25 in the MAC layer function #1 and the cost management unit 25 in the MAC layer function #2 update the aforementioned costs of the LCHs to "20". It should be noted that the aforementioned PBR value (cost) corresponding to the transmission rate to be guaranteed as the EPS bearer is "20" in this time point.

Hereinafter, with reference to FIG. 6, description is provided for an operation of the mobile communication system according to the present embodiment, specifically, an operation of the mobile station UE according to the present embodiment.

As illustrated in FIG. 6, in step S201, the mobile station UE determines whether the foregoing "Inter-node UP aggregation" is being performed or not.

The mobile station UE advances this operation to step S202 if it determines that the foregoing "Inter-node UP aggregation" is being performed, or advances this operation to step S203 if it determines that the foregoing "Inter-node UP aggregation" is not being performed.

In step S202, the MAC layer functions #1, #2 in the mobile station UE exchange the information on the costs of the LCHs, update the costs of the LCHs managed by themselves, respectively, and perform the aforementioned PBR control based on the updated costs of the LCHs.

On the other hand, in step S203, the MAC layer functions #1, #2 in the mobile station UE perform the already-known PBR control.

The features of the present embodiment may also be expressed as follows.

A first feature of the present embodiment is summarized a mobile station UE configured to be able to perform "Inter-node UP aggregation (carrier aggregation)" using CC (component carrier) #1 under a radio base station eNB#1 (first radio base station) and CC#2 under a radio base station eNB#2 (second radio base station), the mobile station UE including a MAC layer function #1 and a MAC layer function #2 each of which is provided for each of the CCs or each of management units configured to manage communications with the respective radio base stations eNB. Here, each of the MAC layer functions #1, #2 includes: a cost management unit 25 configured to manage a cost of LCH (logical channel) involved in the "Inter-node UP aggregation"; a priority management unit 24 configured to manage a priority of the LCH; and a bearer management unit 26 configured to allocate transmission resources to data for the LCH based on the priority and the cost of the LCH, and the cost management unit 25 is configured to update the cost of the LCH managed by the cost management unit 25 itself, based on a PBR value informed by a network.

According to this feature, even if "Inter-node UP aggregation" is being performed, it is possible to guarantee an adequate transmission rate while avoiding a situation where an excessively high transmission rate is guaranteed.

A second feature of the present embodiment is summarized a mobile station UE configured to be able to perform CA using CC#1 under a radio base station eNB#1 and CC#2 under a radio base station eNB#2, the mobile station UE including a MAC layer function #1 and a MAC layer function #2 each of which is provided for each of the CCs or each of management units configured to manage communications with the respective radio base stations eNB. Here, each of the MAC layer functions #1, #2 includes: a cost management unit 25 configured to manage a cost of LCH involved in the "Inter-node UP aggregation", the cost of the LCH corresponding to a PBR value set for the LCH; a priority management unit 24 configured to manage a priority of the LCH; and a bearer management unit 26 configured to allocate transmission resources to data for the LCH based on the priority and the cost of the LCH, and the cost management unit 25 of the MAC layer function #1 is configured to exchange information on the costs of the LCHs with the cost management unit 25 in the MAC layer function #2, and update the cost of the LCH managed by the cost management unit 25 itself.

According to this feature, even if "Inter-node UP aggregation" is being performed and the network does not inform any of the MAC layer functions #1, #2 of the PBR value, it is possible to guarantee an adequate transmission rate while avoiding a situation where an excessively high transmission rate is guaranteed.

A third feature of the present embodiment is summarized a mobile communication system configured to enable a mobile station UE to perform CA using CC#1 under a radio base station eNB#1 and CC#2 under a radio base station eNB#2. Here, the mobile station UE is provided with a MAC layer function #1 and a MAC layer function #2 each of which is provided for each of the CCs or each of management units configured to manage communications with the respective radio base stations eNB, each of the MAC layer functions #1, #2 includes: a cost management unit 25 configured to manage a cost of LCH involved in the "Inter-node UP aggregation"; a priority management unit 24 configured to manage a priority of the LCH; and a bearer management unit 26 configured to allocate transmission resources to data for the LCH based on the priority and the cost of the LCH, and the radio base station eNB#1 or the radio base station eNB#2 is configured to inform each of the MAC layer functions #1, #2 of a PBR value to be set, and the cost management unit 25 of each of the MAC layer functions #1, #2 is configured to update the cost of the LCH managed by the cost management unit 25 itself, based on the informed PBR value.

According to this feature, even if "Inter-node UP aggregation" is being performed, it is possible to guarantee an adequate transmission rate while avoiding a situation where an excessively high transmission rate is guaranteed In the third feature of the present embodiment, the radio base station eNB#1 or the radio base station eNB#2 may be configured to inform each of the MAC layer functions #1, #2 of the PBR value to be set in a form of a ratio between the MAC layer functions #1, #2.

According to this feature, even if the transmission rate to be guaranteed in the EPS bearer involved in the foregoing "Inter-node UP aggregation" is changed, it is possible to guarantee an adequate transmission rate without again notifying both the MAC layer functions #1, #2 of the PER values to be set.

In the third feature of the present embodiment, the PBR value may be determined by a radio base station MeNB (master radio base station).

According to this feature, it is possible to reduce the processing load on the radio base station eNB#2 as the small radio base station SeNB, and to simplify the function of the radio base station eNB#2.

In the third feature of the present embodiment, the radio base station eNB#1 and the radio base station eNB#2 may be configured to determine the PBR values by negotiating with each other.

According to this feature, it is possible to avoid a situation where the PBR value unachievable by the radio base station eNB#2 is Set.

Here, the foregoing operations of the mobile station UE and the radio base stations eNB#1/eNB#2 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base stations eNB#1/eNB#2. Otherwise, the storage medium and the processor may be provided as discrete components inside the mobile station UE and the radio base stations eNB#1/eNB#2. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-171402 (filed on Aug. 21, 2013) is incorporated by reference in the present specification.

INDUSTRIAL APPLICABILITY

As has been described above, according to the present invention, it is possible to provide a mobile station and a mobile communication system capable of guaranteeing an adequate transmission rate in a case where "Inter-node UP aggregation" is being performed.

EXPLANATION OF THE REFERENCE NUMERALS eNB#1, eNB#2 radio base station
UE mobile station
11, 22 transmission unit
12, 21 reception unit
13 determination unit
23 CA management unit
24 priority management unit
25 cost management unit
26 bearer management unit

The invention claimed is:
1. A mobile station comprising:
a transceiver that simultaneously communicates with a first radio base station and a second radio bases station using carrier aggregation;
a first Media Access Control (MAC) layer function that manages communication with the first radio base station and comprises a first logical channel used for transmission to the first radio base station that performs the carrier aggregation; and a second MAC layer function that manages communication with the second radio base station and comprises a second logical channel used for transmission to the second radio base station that performs the carrier aggregation, wherein the first and second MAC layer functions manage costs of the first and second logical channels, respectively, the first and second MAC layer functions manage priorities of the first and second logical channels, respectively, the first and second MAC layer functions allocate the first and second transmission resources to the first and second logical channels based on the priorities and the costs, respectively, each of the costs is based on a Prioritized Bit Rate (PBR) value set for each of the first and second logical channels, and the first and second MAC layer functions update the costs based on PBR values informed by a network, respectively.

2. A mobile station comprising:

a transceiver that simultaneously communicates with a first radio base station and a second radio bases station using carrier aggregation;

a first Media Access Control (MAC) layer function that manages communication with the first radio base station and comprises a first logical channel used for transmission to the first radio base station that performs the carrier aggregation; and a second MAC layer function that manages communication with the second radio base station and comprises a second logical channel used for transmission to the second radio base station that performs the carrier aggregation, wherein the first and second MAC layer functions manage costs of the first and second logical channels, respectively, each of the costs corresponds to a Prioritized Bit Rate (PBR) value set for each of the first and second logical channels;

the first and second MAC layer functions manage priorities of the first and second logical channels, respectively, the first and second MAC layer functions allocate the first and second transmission resources to the logical channel based on the priorities and the costs, respectively, each of the costs is based on a PBR value set for each of the first and second logical channels, the first MAC layer function receives information on the cost of the second logical channel from the second MAC layer function, and updates the cost of the first logical channel based on the information on the cost of the second logical channel, and the second MAC layer function receives information on the cost of the first logical channel from the first MAC layer function, and updates the cost of the second logical channel based on the information on the cost of the first logical channel.

3. A mobile communication system comprising:

a first radio base station;

a second radio base station; and a mobile station that simultaneously communicates with the first radio base station and the second radio bases station using carrier aggregation, wherein the mobile station comprises:

a first Media Access Control (MAC) layer function that manages communication with the first radio base station and comprises a first logical channel used for transmission to the first radio base station that performs the carrier aggregation; and a second MAC layer function that manages communication with the second radio base station and comprises a second logical channel used for transmission to the second radio base station that performs the carrier aggregation, the first and second MAC layer functions manage costs of the first and second logical channels, respectively, the first and second MAC layer functions manage priorities of the first and second logical channels, respectively, the first and second MAC layer functions allocate the first and second transmission resources to the first and second logical channels based on the priorities and the costs, respectively, and the mobile station receives at least one of a first Prioritized Bit Rate (PBR) value from the first radio base station and a second PBR value from the second radio base station, the costs of the first and second logical channels are based on the first and second PBR values, respectively, and the first and second MAC layer functions update the costs of the first and second logical channels based on the first and second PBR values, respectively.

4. The mobile communication system according to claim 3, wherein the first and second PBR values are represented as a ratio between the first and second MAC layer functions.

5. The mobile communication system according to claim 3, wherein the first radio base station is a master radio base station, and wherein the first PBR value is determined by the first radio base station.

6. The mobile communication system according to claim 3, wherein the first radio base station and the second radio base station determine the first and second PBR values, respectively, by negotiating with each other.

* * * * *